US012728823B2

(12) United States Patent
Jung et al.

(10) Patent No.: US 12,728,823 B2
(45) Date of Patent: Sep. 8, 2026

(54) ELECTRONIC BRAKE SYSTEM

(71) Applicant: HL MANDO CORPORATION, Gyeonggi-do (KR)

(72) Inventors: Kyung Ho Jung, Gyeonggi-do (KR); Hee Chul Jung, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 549 days.

(21) Appl. No.: 18/036,163

(22) PCT Filed: Apr. 8, 2022

(86) PCT No.: PCT/KR2022/005142
§ 371 (c)(1),
(2) Date: May 10, 2023

(87) PCT Pub. No.: WO2022/216119
PCT Pub. Date: Oct. 13, 2022

(65) Prior Publication Data

US 2024/0010173 A1 Jan. 11, 2024

(30) Foreign Application Priority Data

Apr. 8, 2021 (KR) ........................ 10-2021-0045847

(51) Int. Cl.
*B60T 7/12* (2006.01)
*B60T 7/04* (2006.01)
(Continued)

(52) U.S. Cl.
CPC ................ *B60T 7/12* (2013.01); *B60T 7/042* (2013.01); *B60T 8/326* (2013.01); *B60T 8/885* (2013.01);
(Continued)

(58) Field of Classification Search
CPC . B60T 7/12; B60T 8/326; B60T 13/62; B60T 7/042; B60T 8/94; B60T 8/885;
(Continued)

(56) References Cited

U.S. PATENT DOCUMENTS 10,576,943 B2 * 3/2020 Feigel .................. B60T 13/686
10,739,809 B2 * 8/2020 Wojciechowski .. B60W 30/182
(Continued)

FOREIGN PATENT DOCUMENTS

CN 103552557 2/2014
CN 107757589 3/2018
(Continued)

OTHER PUBLICATIONS

International Search Report for PCT/KR2022/005142 mailed on Jul. 28, 2022 and its English Machine Translation by the WIPO (now published as WO 2022/216119).
(Continued)

*Primary Examiner* — Pamela Rodriguez
(74) *Attorney, Agent, or Firm* — WOMBLE BOND DICKINSON (US) LLP

(57) ABSTRACT

Disclosed herein is an electronic brake system. An electronic brake system according to one aspect of the present disclosure includes a pedal unit connected to a brake pedal and operated by a driver's pedal effort and a brake operating unit for generating pressure of a pressing medium for braking a vehicle based on a signal output in response to a displacement of the brake pedal, wherein the pedal unit may include a pedal displacement actuator for adjusting the displacement of the brake pedal from a first position to a second position when the vehicle enters an autonomous traveling mode in which a braking operation is not required by the driver, the brake operating unit may include a first controller for controlling the generation of the pressure, and when the
(Continued)

vehicle enters the autonomous traveling mode, the first controller may control the pedal displacement actuator to displace the brake pedal from the first position to the second position.

12 Claims, 5 Drawing Sheets

(51) Int. Cl.

| | |
|---|---|
| ***B60T 8/32*** | (2006.01) |
| ***B60T 8/88*** | (2006.01) |
| ***B60T 8/94*** | (2006.01) |
| ***B60T 13/14*** | (2006.01) |
| ***B60T 13/62*** | (2006.01) |
| ***G05G 5/03*** | (2008.04) |

(52) U.S. Cl.
CPC .............. *B60T 8/94* (2013.01); *B60T 13/142* (2013.01); *B60T 13/148* (2013.01); *B60T 13/62* (2013.01); *B60T 2270/402* (2013.01); *B60T 2270/403* (2013.01); *B60T 2270/404* (2013.01); *B60T 2270/82* (2013.01); *G05G 5/03* (2013.01); *G05G 2505/00* (2013.01)

(58) Field of Classification Search
CPC ........ B60T 7/06; B60T 13/148; B60T 13/142; B60T 2270/82; B60T 2270/402; B60T 2270/404; B60T 2270/403; B60T 8/4081; B60T 17/221; G05G 5/03; G05G 1/44; G05G 2505/00; B60W 60/00
See application file for complete search history.

(56) References Cited

U.S. PATENT DOCUMENTS

| | | | | |
|---|---|---|---|---|
| 10,889,226 | B1 | 1/2021 | Dean et al. | |
| 10,988,097 | B2 * | 4/2021 | Ghaffari | B60R 21/09 |
| 2015/0151726 | A1 | 6/2015 | McClain et al. | |
| 2019/0176785 | A1 | 6/2019 | Hansmann | |
| 2020/0148186 | A1 | 5/2020 | Zhu et al. | |
| 2021/0402969 | A1 * | 12/2021 | Jung | B60T 17/06 |
| 2022/0194339 | A1 * | 6/2022 | Tarandek | B60T 13/745 |

FOREIGN PATENT DOCUMENTS

| | | | |
|---|---|---|---|
| DE | 10 2012 215 627 | | 3/2014 |
| DE | 10 2014 214 786 | | 1/2016 |
| DE | 10 2017 214 187 | | 2/2018 |
| DE | 102014214789 | * | 3/2019 |
| DE | 10 2019 107 285 | | 10/2019 |
| DE | 11 2018 005 790 | | 8/2020 |
| DE | 10 2020 105 675 | | 10/2020 |
| JP | 2006-281865 | | 10/2006 |
| KR | 10-2018-0019272 | | 2/2018 |
| KR | 10-2020-0140752 | | 12/2020 |
| KR | 20210120340 | * | 10/2021 |

OTHER PUBLICATIONS

Written Opinion of the International Searching Authority for PCT/KR2022/005142 mailed on Jul. 28, 2022 and its English Machine Translation by the WIPO (now published as WO 2022/216119).

Office Action (1st) dated Jan. 4, 2026 for Chinese Patent Application No. 202280006487.7 and its English translation by Google Translate.

Office Action dated Apr. 15, 2026 for German Patent Application No. 11 2022 002 026.1 and its English translation provided by Applicant's foreign counsel.

Notice of Allowance dated Jun. 23, 2026 for Chinese Patent Application No. 202280006487.7 and its English translation by Google Translate.

* cited by examiner

ELECTRONIC BRAKE SYSTEM

CROSS-REFERENCE TO RELATED APPLICATIONS

This application is the U.S. National Stage of International Patent Application No. PCT/KR2022/005142 filed on Apr. 8, 2022, which claims priority to and the benefit of Korean Patent Application No. 10-2021-0045847, filed on Apr. 8, 2021, the disclosure of which is incorporated herein by reference in its entirety.

BACKGROUND

1. Technical Field

The present disclosure relates to an electronic brake system, and more specifically, to an electronic brake system for generating a braking force using a signal corresponding to a displacement of a brake pedal.

2. Discussion of Related Art

Research and development related to autonomous traveling in which a vehicle travels by itself without driver's steering, acceleration, and braking operations is being actively conducted. Therefore, a level of the autonomous traveling applied to the vehicle is increasing, and the necessity of operating the vehicle by the driver while the vehicle travels is gradually decreasing.

As described above, as autonomous traveling technologies develop, there is a demand to increase space utilization around a driver's seat by adjusting a displacement of a mechanism such as a steering wheel or a brake pedal that does not need to be operated by the driver in an autonomous traveling mode. For example, when a displacement of the brake pedal is adjusted toward a front side of the vehicle in the autonomous traveling mode, the driver will be able to utilize legroom of the driver's seat widely.

Meanwhile, conventional brake systems have a structure in which hydraulic pressure required to brake wheel cylinders is supplied through a mechanically connected booster when a driver presses a brake pedal. However, in recent years, in order to efficiently implement various braking functions, an electronic brake system, in which when a driver presses a brake pedal, a pedal displacement sensor or the like converts the driver's braking intention into an electric signal, and based on the electric signal, a hydraulic pressure supply device supplies hydraulic pressure required for braking to a wheel cylinder, is widely used.

In this situation, there is a need to develop a technology for efficiently and stably implementing the displacement of the brake pedal in the autonomous traveling mode in the electronic brake system as described above.

SUMMARY

The present disclosure is directed to providing an electronic brake system for adjusting the displacement of a brake pedal in order to increase the utilization of legroom of a driver's seat in an autonomous traveling mode in which an operation of the brake pedal is not required.

In addition, the present disclosure is directed to providing an electronic brake system, which may reliably displace a brake pedal back to a position operable by a driver when an autonomous traveling mode is terminated and a braking operation is required by the driver.

The objects of the present disclosure are not limited to the above-described objects, and other objects not mentioned will be able to be clearly understood by those skilled in the art to which the present disclosure pertains from the following description.

According to one aspect of the present disclosure, there is provided an electronic brake system including a pedal unit connected to a brake pedal and operated by a driver's pedal effort and a brake operating unit for generating pressure of a pressing medium for braking a vehicle based on a signal output in response to a displacement of the brake pedal, wherein the pedal unit includes a pedal displacement actuator for adjusting the displacement the brake pedal from a first position to a second position when the vehicle enters an autonomous traveling mode in which a braking operation is not required by the driver, the brake operating unit includes a first controller for controlling the generation of the pressure, and when the vehicle enters the autonomous traveling mode, the first controller controls the pedal displacement actuator to displace the brake pedal from the first position to the second position.

In this case, the second position may be the same as a position when the brake pedal is depressed by a predetermined pedal effort.

In addition, the second position may be a position where the displacement of the brake pedal is linearly adjusted toward a front of the vehicle.

In addition, the second position may be a position where the brake pedal is close to a firewall that is a boundary between a driver's seat of the vehicle and a front engine room of the vehicle.

In addition, when the autonomous traveling mode is terminated and the braking operation is required by the driver, the first controller may control the pedal displacement actuator to displace the brake pedal from the second position to the first position.

In addition, the first controller may transmit a control signal for the pedal displacement actuator to the pedal displacement actuator through a controller area network (CAN) of the vehicle.

In addition, the first controller may be directly connected to the pedal displacement actuator, and when the transmission of the control signal for the pedal displacement actuator through the CAN of the vehicle fails, the first controller may directly transmit the control signal to the pedal displacement actuator.

In addition, the first controller may be directly connected to the pedal displacement actuator through wires through which the control signal for the pedal displacement actuator may be transmitted.

In addition, the brake operating unit may further include a pressure pump for forming the pressure of the pressing medium based on the signal, and the first controller may control at least a portion of output power of the pressure pump.

In addition, the pedal unit and the brake operating unit may be disposed to be physically separated from each other.

In addition, the brake operating unit may further include a second controller for controlling the generation of the pressure together with the first controller or on behalf of the first controller when the first controller fails, and when the vehicle enters the autonomous traveling mode, the second controller may control the pedal displacement actuator to displace the brake pedal from the first position to the second position when the control of the pedal displacement actuator performed by the first controller fails.

In addition, each of the first controller and the second controller may be connected to an independent power source.

In addition, the first controller and the second controller may each be disposed in a single control module package and disposed on an independent printed circuit board (PCB).

In addition, the pedal unit may include a pedal simulator, and the pedal simulator may include a cylinder body having a single chamber therein, an elastic member disposed inside the chamber, and a piston for pressing the elastic member by the pedal effort applied to the brake pedal.

In addition, the pressing medium fills the chamber, and the pressing medium filling the chamber may be supplied to the brake operating unit in a fall back mode of the brake operating unit.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, embodiments of the present disclosure will be described in detail so that those skilled in the art to which the present disclosure pertains can easily carry out the embodiments. The present disclosure may be implemented in many different forms and is not limited to the embodiments described herein. In order to clearly describe the present disclosure, portions not related to the description are omitted from the accompanying drawings.

Since the configuration shown in the embodiments and drawings described in the specification corresponds to one exemplary embodiment of the present disclosure and does not represent all of the technical spirit of the present disclosure, the corresponding configuration may be replaced by various equivalents and modifications at the time of filing the present disclosure.

In the specification, it should be understood that the terms such as "comprise" or "have" are intended to specify the presence of features, numbers, steps, operations, components, parts, or combinations thereof described in the specification and do not preclude the possibility of the presence or addition of one or more other features, numbers, steps, operations, components, parts, or combinations thereof. In addition, when a certain component is "connected" with another component, it includes not only a case in which these components are directly connected to each other but also a case in which these components are indirectly connected to each other unless otherwise specified.

Figure 1:
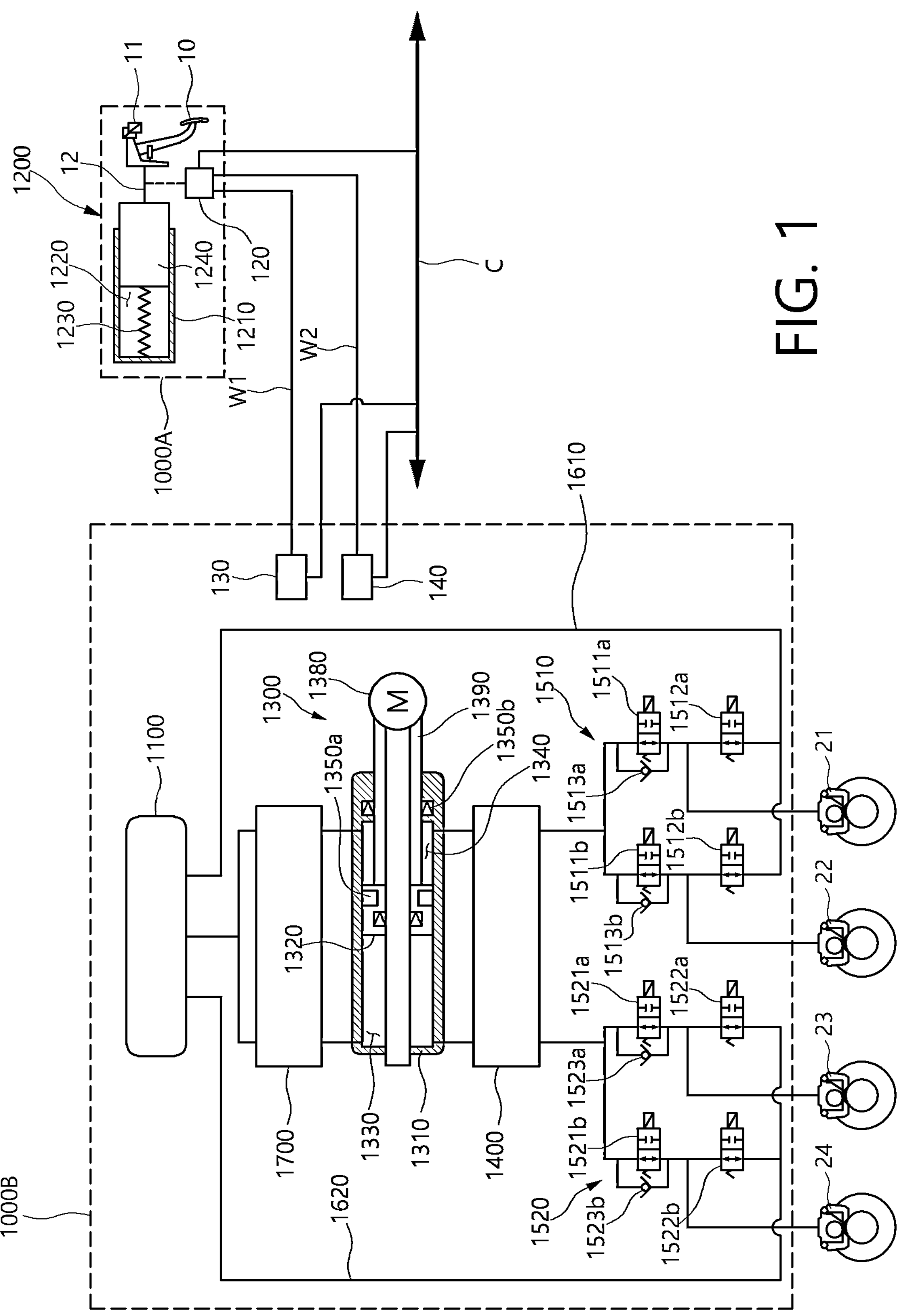
FIG. 1 is a configuration diagram of an electronic brake system according to a first embodiment of the present disclosure.

FIG. 1 is a configuration diagram of an electronic brake system according to a first embodiment of the present disclosure.

Referring to FIG. 1, the electronic brake system according to the first embodiment of the present disclosure may include a pedal unit 1000A connected to a brake pedal 10 and operated by a driver's pedal effort and a brake operating unit 1000B for generating pressure of a pressing medium for braking a vehicle based on a signal output in response to a displacement of the brake pedal 10. In this case, the displacement of the brake pedal 10 may be detected by a pedal displacement sensor 11, and the signal may be an electrical signal output by the pedal displacement sensor 11.

In the first embodiment of the present disclosure, the pedal unit 1000A and the brake operating unit 1000B may be disposed to be physically separated from each other. As the pedal unit 1000A and the brake operating unit 1000B are installed to be physically separated from each other, a degree of installation freedom of the electronic brake system can be improved. For example, the pedal unit 1000A is disposed adjacent to a driver's seat, and the brake operating unit 1000B is disposed in another free space within a vehicle, and thus space utilization of the vehicle and ease of installation of the electronic brake system can be improved.

The pedal unit 1000A includes a pedal displacement actuator 120 for adjusting the displacement of the brake pedal 10 from a first position to a second position when the vehicle enters an autonomous traveling mode in which a braking operation is not required by a driver. The pedal displacement actuator 120 may directly change the position of the brake pedal 10 or changing a position of any component connected to the brake pedal 10 so that the position of the brake pedal 10 is changed. For example, the first position may be a position where an operation of the brake pedal 10 by the driver is possible, and the second position may be a position where the brake pedal 10 is moved away from the driver's seat in order to increase space utilization of legroom of the driver's seat. By arranging the brake pedal 10 at the second position in the autonomous traveling mode, a space in which the driver may move his/her legs expands, and the space utilization of the vehicle may increase.

The pedal displacement actuator 120 may be mounted on a connecting unit 12 of a pedal simulator 1200 to be described below. However, the installation position of the pedal displacement actuator 120 is not limited and may also be mounted on any other component connected to the brake pedal 10. Meanwhile, the pedal displacement actuator 120 may include a driving motor.

Figure 2:
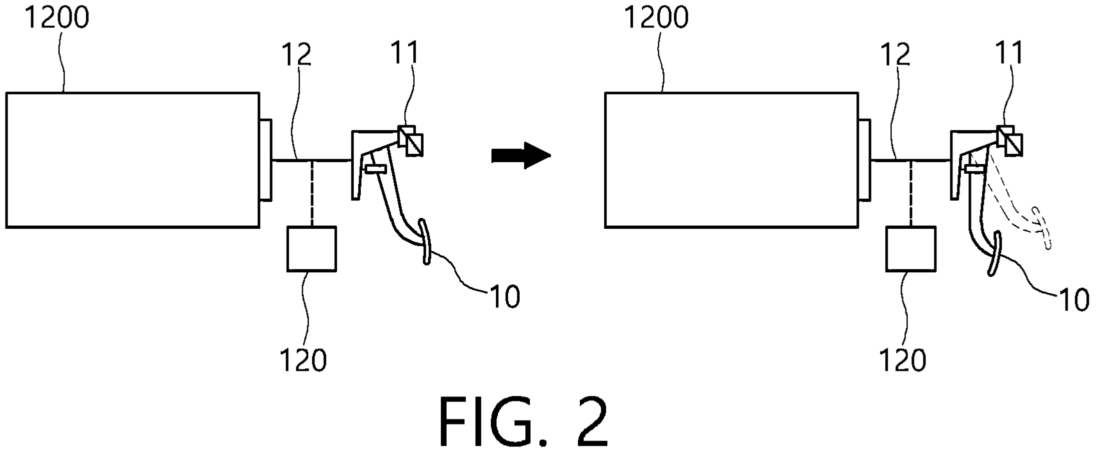
FIG. 2 is a view showing that the displacement of a brake pedal is adjusted from a first position to a second position in the electronic brake system according to the first embodiment of the present disclosure.

FIG. 2 shows the displacement of the brake pedal adjusted from the first position to the second position in the electronic brake system according to the first embodiment of the present disclosure. Referring to FIG. 2, in the first embodiment of the present disclosure, the second position may be the same as a position when the brake pedal 10 is pressed by a predetermined pedal effort. Of course, the second position is not limited by the first embodiment of the present disclosure. As another example, the second position may be a position where the displacement of the brake pedal 10 is linearly adjusted toward the front of the vehicle. Meanwhile, the second position may also be a position where the brake pedal 10 is closer to a firewall that is a boundary between the driver's seat of the vehicle and a front engine room of the vehicle.

Meanwhile, when the autonomous traveling mode is terminated and a braking operation is required by the driver, the pedal displacement actuator 120 displaces the brake pedal 10 from the second position to the first position. Therefore, the brake pedal 10 may be operated by the driver.

In addition, the pedal unit 1000A further includes the pedal simulator 1200 for generating a reaction force against the driver's pedal effort and providing the driver with a sense of pedal. When the driver applies a pedal effort to the brake pedal 10 for braking operation, the pedal simulator 1200 provides a reaction force to the driver and provides a stable sense of pedal.

The pedal simulator 1200 may include a cylinder body 1210, a single chamber 1220 formed inside the cylinder body 1210, an elastic member 1230 disposed inside the chamber 1220, and a piston 1240 for pressing the elastic member 1230 by the pedal effort applied to the brake pedal 10. The piston 1240 is connected to the brake pedal 10 via the connecting unit 12 and is reciprocally accommodated in the chamber 1220. For example, the connecting unit 12 may be an input rod. The piston 1240 presses the elastic member 1230 by the pedal effort applied to the brake pedal 10. The elastic member 1230 is compressed when the displacement of the piston 1240 is adjusted by the pedal effort and provides a sense of pedal.

In the first embodiment of the present disclosure, the elastic member 1230 is disposed in the chamber 1220 of the pedal simulator 1200, and the pressing medium does not fill the chamber 1220. The pedal simulator 1200 may be defined as a dry type.

The brake operating unit 1000B generates a pressure of the pressing medium for braking the vehicle based on a signal output in response to the displacement of the brake pedal 10. In the first embodiment of the present disclosure, the brake operating unit 1000B may include a first controller 130 and a second controller 140. The first controller 130 controls the generation of pressure of the pressing medium. In addition, the second controller 140 controls the generation of the pressure of the pressing medium together with the first controller 130 or on behalf of the first controller 130 when the first controller 130 fails.

The first controller 130 also controls the pedal displacement actuator 120 in addition to the pressure generation control of the pressing medium. More specifically, the first controller 130 controls the pedal displacement actuator 120 to displace the brake pedal 10 from the first position to the second position when the vehicle enters the autonomous traveling mode. In addition, when the autonomous traveling mode is terminated and the braking operation is required by the driver, the first controller 130 may control the pedal displacement actuator 120 to displace the brake pedal 10 from the second position to the first position.

The second controller 140 may control the pedal displacement actuator 120 to displace the brake pedal 10 from the first position to the second position when the control of the pedal displacement actuator 120 performed by the first controller fails when the vehicle enters the autonomous traveling mode. In addition, in spite of a situation in which the autonomous traveling mode is terminated and the braking operation is required by the driver, when the displacement of the brake pedal 10 is not adjusted from the second position to the first position due to a failure of the control of the pedal displacement actuator 120 by the first controller 130, the second controller 140 may control the pedal displacement actuator 120 to displace the brake pedal 10 from the second position to the first position. Therefore, the displacement of the position of the brake pedal 10 may be reliably adjusted when the vehicle enters the autonomous traveling mode and upon terminating the autonomous traveling mode.

The first controller 130 and the second controller 140 may transmit control signals for the pedal displacement actuator 120 to the pedal displacement actuator 120 through a controller area network (CAN) C of the vehicle. In other words, the first controller 130 and the second controller 140 may be indirectly connected to the pedal displacement actuator 120 through the CAN C of the vehicle.

In addition, the first controller 130 and the second controller 140 may be directly connected to the pedal displacement actuator 120. In other words, when transmission of the control signal through the CAN C fails, the first controller 130 or the second controller 140 may directly transmit the control signal to the pedal displacement actuator 120. More specifically, the first controller 130 and the second controller 140 may be directly connected to the pedal displacement actuator 120 through wires through which the control signals for the pedal displacement actuator 120 may be transmitted. Referring to FIG. 1, the first controller 130 may be directly connected to the pedal displacement actuator 120 through a first wire W1, and the second controller 140 may be directly connected to the pedal displacement actuator 120 through a second wire W2.

The brake operating unit 1000B may further include a reservoir 1100 for storing the pressing medium, a pressure pump 1300 for receiving an electrical signal corresponding to the driver's braking intention from the pedal displacement sensor 11 for detecting the displacement of the brake pedal 10 and generating pressure of the pressing medium through a mechanical operation, a pressure adjuster 1400 for adjusting the pressure of the pressing medium discharged from the pressure pump 1300 or returned to the pressure pump 1300, first and second hydraulic circuits 1510 and 1520 having wheel cylinders 21, 22, 23, and 24 for braking each vehicle wheel by receiving hydraulic pressure of the pressing medium, and a pressure dumper 1700 provided between the pressure pump 1300 and the reservoir 1100 and for controlling the flow of the pressure medium.

The reservoir 1100 may accommodate and store the pressing medium therein. The reservoir 1100 may be connected to a plurality of components, such as the pressure pump 1300, the first and second hydraulic circuits 1510 and 1520, and the pressure dumper 1700, and may supply or receive the pressing medium.

The pressure pump 1300 forms the pressure of the pressing medium based on the signal. For example, the first controller 130 may control a portion of the output power of the pressure pump 1300, and the second controller 140 may control the remaining output power of the pressure pump 1300. In the first embodiment of the present disclosure, the pressure pump 1300 may be driven by a motor 1380, and the motor 1380 may be a dual winding motor. In this case, the first controller 130 may supply power to one of dual wires, and the second controller 140 may supply power to the other wire. Meanwhile, when any one of the first controller 130 and the second controller 140 fails, the other one may generate an additional output power and control the pressure pump 1300.

The pressure pump 1300 may further include a cylinder block 1310 provided to accommodate the pressing medium, a hydraulic piston 1320 accommodated in the cylinder block 1310, and sealing members 1350*a* and 1350*b* disposed between the hydraulic piston 1320 and the cylinder block 1310 to seal the pressure chambers 1330 and 1340. In this case, the motor 1380 may be rotated by the electrical signal of the pedal displacement sensor 11, and a driving force of the motor 1380 may be transmitted to the hydraulic piston 1320 through a driving shaft 1390.

The pressure chambers 1330 and 1340 may include the first pressure chamber 1330 positioned at one side of the hydraulic piston 1320 and a second pressure chamber 1340 positioned at the other side of the hydraulic piston 1320. In addition, the sealing members 1350*a* and 1350*b* include the piston sealing member 1350*a* provided between the hydraulic piston 1320 and the cylinder block 1310 to seal between the first pressure chamber 1330 and the second pressure chamber 1340 and the driving shaft sealing member 1350*b* provided between the driving shaft 1390 and the cylinder block 1310 to seal the second pressure chamber 1340 and an opening of the cylinder block 1310.

When the motor 1380 rotates in one direction, the driving shaft 1390 may move the hydraulic piston 1320 to one side and generate pressure in the first pressure chamber 1330. In addition, when the motor 1380 rotates in the other direction, the driving shaft 1390 may move the hydraulic piston 1320 to the other side and generate pressure in the second pressure chamber 1340.

The pressure adjuster 1400 adjusts the flow of the pressing medium from the pressure pump 1300 toward the wheel cylinders 21, 22, 23, and 24 or the flow of the pressing medium returned from the wheel cylinders 21, 22, 23, and 24 to the pressure pump 1300. The pressure adjuster 1400 may include a plurality of flow paths and valves to smoothly adjust the flow or pressure of the pressing medium. The valves included in the pressure adjuster 1400 may be controlled by the first controller 130 or the second controller 140. Specifically, the first controller 130 may preferentially perform control, and when the control performed by the first controller 130 fails, the control may be performed by the second controller 140.

The first hydraulic circuit 1510 controls the flow of the pressing medium supplied from the pressure adjuster 1400 to the first wheel cylinder 21 and the second wheel cylinder 22. In addition, the second hydraulic circuit 1520 controls the flow of the pressing medium supplied to the third wheel cylinder 23 and the fourth wheel cylinder 24. The first hydraulic circuit 1510 and the second hydraulic circuit 1520 may be controlled by the first controller 130 or the second controller 140. Specifically, the first controller 130 and the second controller 140 may control opening and closing of one or more valves disposed in the first hydraulic circuit 1510 and the second hydraulic circuit 1520. In the first embodiment of the present disclosure, the first controller 130 may preferentially control the first hydraulic circuit 1510 and the second hydraulic circuit 1520, and when the control performed by the first controller 130 fails, the second controller 140 may control the first hydraulic circuit 1510 and the second hydraulic circuit 1520.

The first hydraulic circuit 1510 and the second hydraulic circuit 1520 may include the first to fourth inlet valves 1511*a*, 1511*b*, 1521*a*, and 1521*b* to control the flow and pressure of the pressing medium transmitted to the first to fourth wheel cylinders 21, 22, 23, and 24, respectively. In addition, the first and second hydraulic circuits 1510 and 1520 may include first to fourth check valves 1513*a*, 1513*b*, 1523*a*, and 1523*b* disposed to be respectively connected in parallel to the first to fourth inlet valves 1511*a*, 1511*b*, 1521*a*, and 1521*b*. The first to fourth check valves 1513*a*, 1513*b*, 1523*a*, and 1523*b* are disposed in a bypass flow path and allow only the flow of the pressing medium from each wheel cylinder toward the pressure pump 1300.

In addition, the first and second hydraulic circuits 1510 and 1520 may include first to fourth outlet valves 1512*a*, 1512*b*, 1522*a*, and 1522*b* for controlling the flow of the pressing medium discharged from the first to fourth wheel cylinders 21, 22, 23, and 24 to the reservoir 1100 in order to improve performance when the braking of the wheel cylinder is released. Discharge sides of the first and second outlet valves 1512*a* and 1512*b* and the reservoir 1100 may be connected through a first discharge flow path 1610. In addition, discharge sides of the third and fourth outlet valves 1522*a* and 1522*b* and the reservoir 1100 may be connected through a second discharge flow path 1620.

The pressure dumper 1700 adjusts the flow of the pressing medium between the pressure pump 1300 and the reservoir 1100. The pressure dumper 1700 may include a plurality of flow paths and valves. The valve included in the pressure dumper 1700 may be controlled by the first controller 130 or the second controller 140. Specifically, the first controller 130 may preferentially perform control, and when the first controller 130 fails, the control may be performed by the second controller 140.

When the electronic brake system according to the first embodiment of the present disclosure performs the braking, the brake operating unit operates as follows.

As the motor 1380 of the pressure pump 1300 rotates in one direction or the other direction, the hydraulic piston 1320 moves to one side or the other side and generates pressure in the first pressure chamber 1330 or the second pressure chamber 1340. The pressure discharged from the first pressure chamber 1330 or the second pressure chamber 1340 is transmitted to the respective wheel cylinders 21, 22, 23, and 24 through the pressure adjuster 1400, the first hydraulic circuit 1510, and the second hydraulic circuit 1520 to generate a braking force.

Specifically, the first to fourth inlet valves 1511*a*, 1511*b*, 1521*a*, and 1521*b* are controlled in an open state. In addition, the first to fourth outlet valves 1512*a*, 1512*b*, 1522*a*, and 1522*b* are switched to a closed state to prevent the pressure of the pressing medium from leaking toward the first discharge flow path 1610 or the second discharge flow path 1620.

Meanwhile, a negative pressure is generated in any one of the first pressure chamber 1330 and the second pressure chamber 1340 according to a displacement of the hydraulic piston 1320. The pressure dumper 1700 operates so that the pressing medium stored in the reservoir 1100 may be supplied to the first pressure chamber 1330 or the second pressure chamber 1340 in which the negative pressure is generated.

Figure 3:
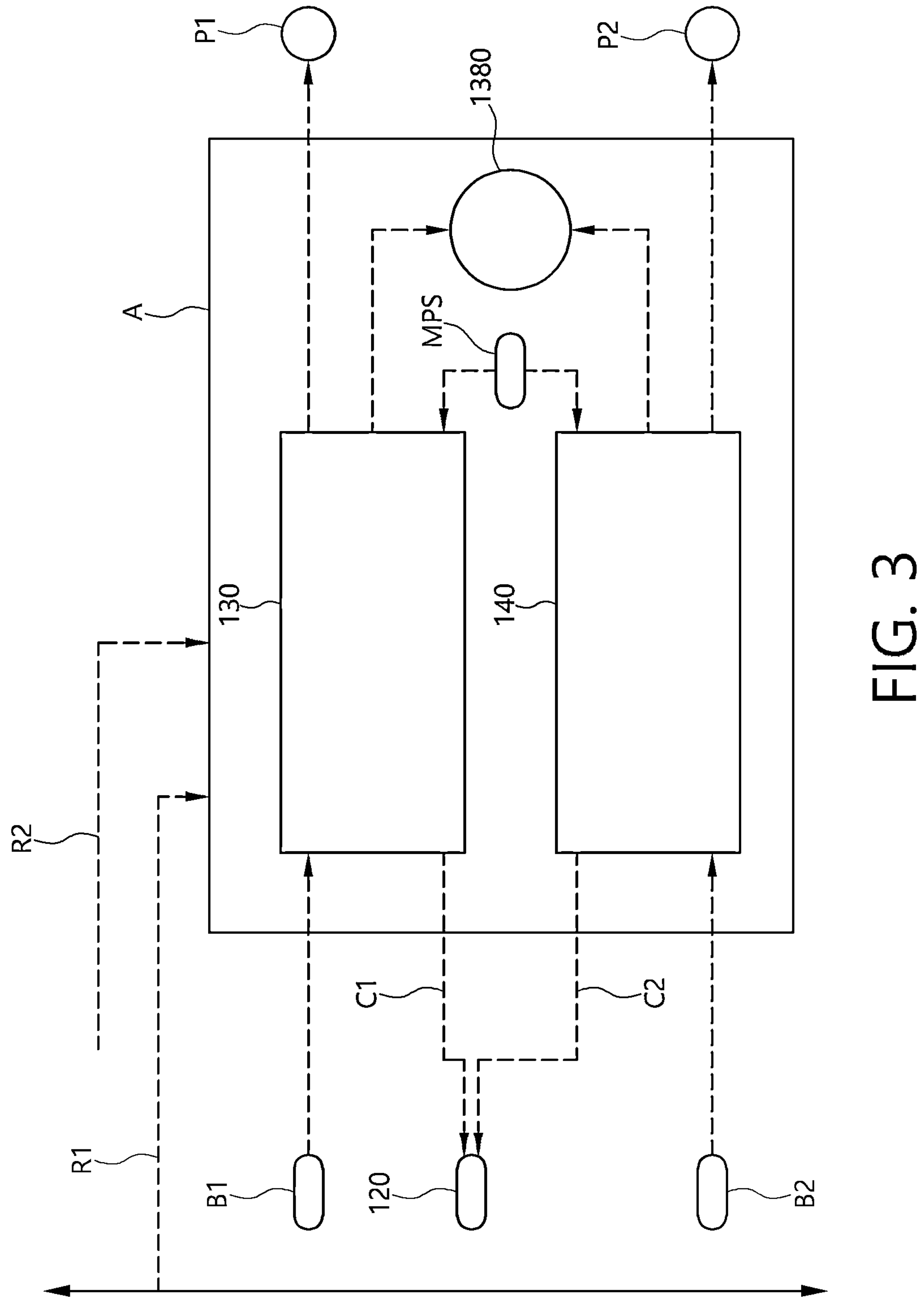
FIG. 3 is a view showing components related to control of the electronic brake system, and the flow of signals and power according to the first embodiment of the present disclosure.

FIG. 3 is a view showing components related to control of the electronic brake system, and the flow of signals and power according to the first embodiment of the present disclosure. Components related to the control of the electronic brake system and the flow of signals and power will be described in more detail with reference to FIG. 3.

In the first embodiment of the present disclosure, the first controller 130 and the second controller 140 may be included as sub components of an autonomous traveling-related control module A. In addition, the first controller 130 and the second controller 140 may each have an independent power source. In other words, the first controller 130 may receive power from a first power source B1, and the second controller 140 may receive power from a second power source B2. Therefore, when the pedal displacement actuator 120 is controlled by the first controller 130, power of the first power source B1 is supplied to the pedal displacement actuator 120, and when the pedal displacement actuator 120 is controlled by the second controller 140, power of the second power source B2 may be supplied to the pedal displacement actuator 120. Therefore, it is possible to secure redundancy in supplying power and improve reliability. Meanwhile, each of the first power source B1 and the second power source B2 may be formed of a battery.

When the vehicle enters the autonomous traveling mode, a request for adjusting the displacement of the brake pedal 10 to the second position is generated by the configuration related to the autonomous traveling control, and the first controller 130 or the second controller 140 receives the corresponding request and generates a control signal for the pedal displacement actuator 120. At this time, the request R1 or R2 for adjusting the displacement of the brake pedal 10 to the second position may be transmitted to the autonomous traveling related control module A through a CAN C of the vehicle or may also be directly transmitted to the autonomous traveling related control module A from an autonomous traveling electronic control unit (ECU) or a chassis domain controller.

Meanwhile, the first controller 130 and the second controller 140 may receive information on a rotation position of the motor 1380 from a motor position sensor MPS of the motor 1380 in relation to the control of the motor 1380 of the pressure pump 1300. Accordingly, the first controller 130 and the second controller 140 may transmit a control signal for the motor 1380. In addition, the first controller 130 and the second controller 140 may also control motors P1 and P2 of an electronic parking brake. More specifically, the first controller 130 may control the motor P1 of a first electronic parking brake, and the second controller 140 may control the motor P2 of a second electronic parking brake. For example, the first electronic parking brake may be disposed on a left wheel of the vehicle, and the second electronic brake may be disposed on a right wheel of the vehicle.

As described above, the first controller 130 and the second controller 140 may also control the motors P1 and P2 of the parking brake of the vehicle in addition to the motor 1380 of the pressure pump 1300 and the driving motor of the pedal displacement actuator 120. In this case, an independent driving circuit is disposed between the first controller 130 and the second controller 140 and the respective motors. Therefore, in the first embodiment of the present disclosure, even when the pedal displacement actuator 120 is controlled, the driving of the motor 1380 of the pressure pump 1300 and the driving of the motors P1 and P2 of the parking brake are not affected.

Meanwhile, the first controller 130 and the second controller 140 may each be disposed in a single control module package and disposed on an independent printed circuit board (PCB).

Figure 4:
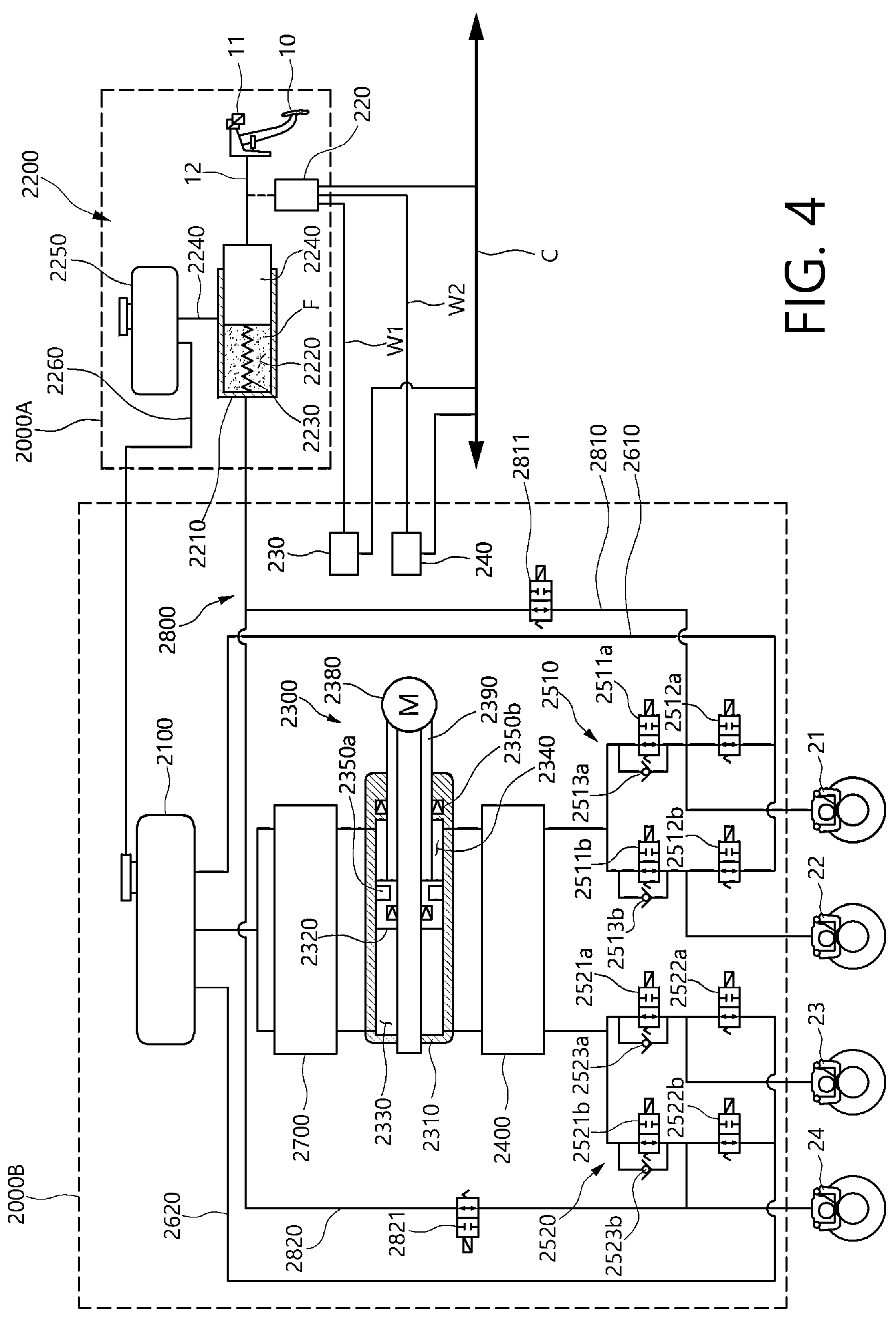
FIG. 4 is a configuration diagram of an electronic brake system according to a second embodiment of the present disclosure.

FIG. 4 is a configuration diagram of an electronic brake system according to a second embodiment of the present disclosure.

Referring to FIG. 4, the electronic brake system according to the second embodiment of the present disclosure may include a pedal unit 2000A connected to a brake pedal 10 and operated by a driver's pedal effort and a brake operating unit 2000B for generating pressure of a pressing medium for braking a vehicle based on a signal output in response to a displacement of the brake pedal 10. In this case, the displacement of the brake pedal 10 may be detected by a pedal displacement sensor 11, and the signal may be an electrical signal output by the pedal displacement sensor 11.

The pedal unit 2000A includes a pedal displacement actuator 220 for adjusting the displacement of the brake pedal 10 from a first position to a second position when the vehicle enters an autonomous traveling mode in which a braking operation is not required by a driver. For example, the first position may be a position where the brake pedal 10 may be operated by the driver, and the second position is a position where the brake pedal 10 is moved away from a driver's seat in order to increase space utilization of legroom of the driver's seat.

Figure 5:
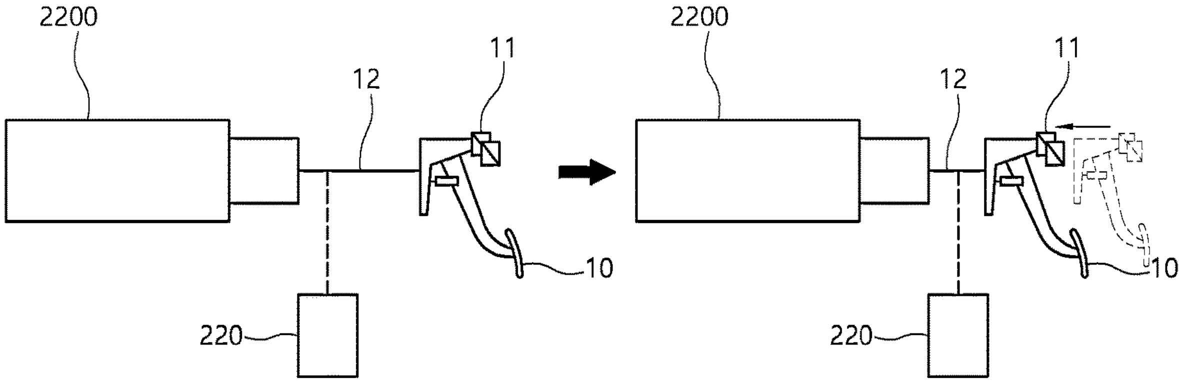
FIG. 5 is a view showing that the displacement of a brake pedal is adjusted from a first position to a second position in the electronic brake system according to the second embodiment of the present disclosure.

FIG. 5 shows a displacement of the brake pedal adjusted from a first position to a second position in the electronic brake system according to the second embodiment of the present disclosure. Referring to FIG. 5, in the second embodiment of the present disclosure, the second position may be a position where the displacement of the brake pedal 10 is linearly adjusted to a predetermined distance toward the front of the vehicle. Meanwhile, when the autonomous traveling mode is terminated and a braking operation is required by the driver, the pedal displacement actuator 220 may displace the brake pedal 10 from the second position to the first position.

The brake operating unit 2000B includes a first controller 230 and a second controller 240. As described in relation to the first embodiment of the present disclosure, the first controller 230 and the second controller 240 control the pedal displacement actuator 220. The first controller 230 controls the pedal displacement actuator 220 to displace the brake pedal 10 from the first position to the second position when the vehicle enters the autonomous traveling mode. In addition, when the autonomous traveling mode is terminated and the braking operation is required by the driver, the first controller 230 may control the pedal displacement actuator 220 to displace the brake pedal 10 from the second position to the first position. Meanwhile, when the control performed by the first controller 230 fails, the pedal displacement actuator 220 may be controlled by the second controller 240.

In the second embodiment of the present disclosure, the first controller 230 and the second controller 240 may transmit control signals for the pedal displacement actuator 220 to the pedal displacement actuator 120 through a CAN C of the vehicle. In addition, the first controller 230 and the second controller 240 may be directly connected to the pedal displacement actuator 220 through a first wire W1 and a second wire W2, respectively. In addition, the components related to the control of the electronic brake system according to the first embodiment of the present disclosure and the flow of signals and power may also be applied to the second embodiment without change.

Meanwhile, a reservoir 2100, a pressure pump 2300, a pressure adjuster 2400, first and second hydraulic circuits 2510 and 2520, and a pressure dumper 2700 of the brake operating unit 2000B are as described in the first embodiment of the present disclosure. Components of the pressure pump 2300, that is, a cylinder block 2310 in which pressure chambers 2330 and 2340 are formed therein, a hydraulic piston 2320, sealing members 1350*a* and 1350*b*, a motor 2380, and a driving shaft 2390 are also the same as in the first embodiment of the present disclosure. In addition, the first and second hydraulic circuits 2510 and 2520 includes first to fourth inlet valves 2511*a*, 2511*b*, 2521*a*, and 2521*b*, first to fourth check valves 2513*a*, 2513*b*, 2523*a*, and 2523*b*, and first to fourth outlet valves 2512*a*, 2512*b*, 2522*a*, and 2522*b*.

Hereinafter, components of the second embodiment of the present disclosure different from those of the first embodiment will be described in detail.

In the second embodiment of the present disclosure, the pedal unit 2000A includes a pedal simulator 2200 for generating a reaction force against a driver's pedal effort and providing the driver with a sense of pedal. The pedal simulator 2200 includes a cylinder body 2210, a single chamber 2220 formed inside the cylinder body 1210, an elastic member 2230 disposed inside the chamber 2220, and a piston 2240 for pressing the elastic member 2230 by the pedal effort applied to the brake pedal 10. In addition, the elastic member 2230 is disposed in the chamber 2220 and a pressing medium F also fills the chamber 2220. For example, the pressing medium F may be brake oil. The pressing medium F filling the chamber 2220 may be the same as the pressing medium of the brake operating unit 2000B. In addition, the pedal simulator 2200 may further include an auxiliary reservoir 2250 for storing the pressing medium F supplied to the cylinder body 2210 or returned from the cylinder block 2310 in fluid communication with the cylinder body 2210.

As described above, the pedal simulator 2200 in which the pressing medium F fills the chamber 2220 may be defined as a wet type. When the pedal simulator 2200 is formed as a wet type, the pressing medium F filling the chamber 2220 of the pedal simulator 2200 may be supplied to the brake operating unit 2000B in a fall back mode of the brake operating unit 2000B. Here, the fall back mode means a case in which the braking force is not normally supplied through the pressure pump 2300 of the brake operating unit 2000B. In a situation in which the braking force is normally supplied through the pressure pump 2300 of the brake operating unit 2000B, the pressing medium F filling the chamber 2220 of the pedal simulator 2200 is not supplied to wheel cylinders. However, when it is impossible to supply the braking force through the pressure pump 2300 of the brake operating unit 2000B, the pressing medium F in the chamber 2220 may supply hydraulic pressure to at least one wheel cylinder through a third hydraulic circuit 2800 to be described below.

In this regard, the brake operating unit 2000B may include the third hydraulic circuit 2800 capable of supplying the pressure of the pressing medium generated from the pedal simulator 2200 to at least one of first to fourth wheel cylinders 21, 22, 23, and 24 when it is impossible to supply the braking force through the pressure pump 2300 of the brake operating unit 2000B. In the second embodiment of the present disclosure, when the pressure of the pressing medium is not formed by the pressure pump 2300 or the pressure of the pressing medium is not supplied to the first to fourth wheel cylinders 21, 22, 23, and 24 through the first hydraulic circuit 2510 and the second hydraulic circuit 2520, the first controller 230 or the second controller 240 may control the third hydraulic circuit 2800 so that the pressure of the pressing medium F generated from the pedal simulator 2200 is supplied to at least any one of the first to fourth wheel cylinders 21, 22, 23, and 24.

More specifically, the third hydraulic circuit 2800 may include a first backup flow path 2810 connecting the pedal simulator 2200 and the first wheel cylinder 21 and a second backup flow path 2820 connecting the pedal simulator 2200 and the fourth wheel cylinder 24. A first cut valve 2811 may be disposed in the first backup flow path 2810, and a second cut valve 2821 may be disposed in the second backup flow path 2820.

In the normal state, the first cut valve 2811 and the second cut valve 2821 are controlled to be closed and thus the pedal simulator 2200 and the first and fourth wheel cylinders 21 and 24 are disconnected, and when the supply of the braking force by the pressure pump 2300 fails, the first cut valve 2811 and the second cut valve 2821 are controlled to be opened and thus the pressing medium F may be supplied from the pedal simulator 2200 to the first and fourth wheel cylinders 21 and 24. For example, the first wheel cylinder 21 and the fourth wheel cylinder 24 may be disposed on a front left wheel and a front right wheel of the vehicle, respectively. In other words, even in a situation where the supply of the braking force by the pressure pump 2300 is impossible, it is possible to secure the minimum safety by supplying pressure from the pedal simulator 2200 to both front wheels of the vehicle.

Meanwhile, the auxiliary reservoir 2250 and the reservoir 2100 may communicate through an auxiliary flow path 2260. Although not shown in FIG. 4, a valve may be disposed in the auxiliary flow path 2260, and the valve is opened only in a situation in which pressure is supplied from the auxiliary reservoir 2250 toward the wheel cylinders and thus the auxiliary reservoir 2250 and the reservoir 2100 may communicate.

In addition, in relation to the control of the third hydraulic circuit 2800, that is, the control of the first cut valve 2811 and the second cut valve 2821, the control may be preferentially performed by the first controller 230. In addition, when the control performed by the first controller 230 fails, the control may be performed by the second controller 240.

An electronic brake system according to the present disclosure can allow the displacement of a brake pedal to be efficiently adjusted by a pedal displacement actuator in an autonomous traveling mode in which an operation of the brake pedal by a driver is not required, thereby improving space utilization of legroom of a driver's seat in the autonomous traveling mode.

The electronic brake system according to the present disclosure can provide high reliability for a positional displacement of the brake pedal by securing redundancy of control of the pedal display actuator.

It should be understood that the effects of the present disclosure are not limited to the above-described effects and include all effects inferable from a configuration of the invention described in the detailed descriptions and claims of the present disclosure.

Although embodiments of the present disclosure have been described, the spirit of the present disclosure is not limited by the embodiments presented in the specification. Those skilled in the art who understand the spirit of the present disclosure will be able to easily suggest other embodiments by adding, changing, deleting, or adding components within the scope of the same spirit, but this may also be included in the scope of the present disclosure.

What is claimed is:

1. An electronic brake system comprising:

a pedal unit connected to a brake pedal and operated by a pedal effort of a driver; and a brake operating unit configured to generate pressure of a pressing medium for braking a vehicle based on a signal output in response to a displacement of the brake pedal, wherein the pedal unit comprises a pedal displacement actuator configured to displace the brake pedal from a first position to a second position when the vehicle enters an autonomous traveling mode in which a braking operation is not required by the driver, the brake operating unit comprises a first controller configured to control the generation of the pressure, and a second controller configured to control the generation of the pressure together with the first controller or on behalf of the first controller when the first controller fails, and when the vehicle enters the autonomous traveling mode, the first controller or the second controller controls the pedal displacement actuator to displace the brake pedal from the first position to the second position, wherein the first controller and the second controller transmit control signals for the pedal displacement actuator to the pedal displacement actuator through a controller area network (CAN) of the vehicle, the first controller is directly connected to the pedal displacement actuator through a first wire, the second controller is directly connected to the pedal displacement actuator through a second wire, and when the transmission of the control signals through the CAN fails, the first controller or the second controller directly transmits the control signal to the pedal displacement actuator through the first wire or the second wire.

2. The electronic brake system of claim 1, wherein the second position is the same as a position when the brake pedal is pressed by a predetermined pedal effort.

3. The electronic brake system of claim 1, wherein the second position is a position where the displacement of the brake pedal is linearly adjusted toward a front of the vehicle.

4. The electronic brake system of claim 1, wherein the first controller controls the pedal displacement actuator to displace the brake pedal from the second position to the first position when the autonomous traveling mode is terminated and the braking operation is required by the driver.

5. The electronic brake system of claim 1, wherein when the vehicle enters the autonomous traveling mode, the second controller controls the pedal displacement actuator to displace the brake pedal from the first position to the second position when the control of the pedal displacement actuator performed by the first controller fails.

6. The electronic brake system of claim 1, wherein the brake operating unit further comprises a pressure pump configured to form the pressure of the pressing medium based on the signal, and the first controller controls a portion of output power of the pressure pump, and the second controller controls the remaining output power of the pressure pump.

7. The electronic brake system of claim 6, wherein, when any one of the first controller and the second controller fails, the other generates an additional output power and controls the pressure pump.

8. The electronic brake system of claim 7, wherein the brake operating unit further comprises a first hydraulic circuit configured to control a flow of a pressing medium supplied to a first wheel cylinder and a second wheel cylinder and a second hydraulic circuit configured to control a flow of a pressing medium supplied to a third wheel cylinder and a fourth wheel cylinder, and the first controller preferentially controls the first hydraulic circuit and the second hydraulic circuit, and when the first controller fails, the second controller controls the first hydraulic circuit and the second hydraulic circuit.

9. The electronic brake system of claim 8, wherein the pedal unit further comprises a master cylinder configured to generate the pressure of the pressing medium according to the pedal effort, and the brake operating unit further comprises a third hydraulic circuit configured to supply the pressure of the pressing medium generated from the master cylinder to at least one of the first to fourth wheel cylinders.

10. The electronic brake system of claim 9, wherein, when the pressure of the pressing medium is not formed by the pressure pump or the pressure of the pressing medium is not supplied to the first to fourth wheel cylinders through the first hydraulic circuit and the second hydraulic circuit, the first controller or the second controller controls the third hydraulic circuit so that the pressure of the pressing medium generated from the master cylinder is supplied to at least any one of the first to fourth wheel cylinders.

11. The electronic brake system of claim 1, wherein the pedal unit and the brake operating unit are disposed to be physically separated from each other.

12. The electronic brake system of claim 1, wherein the pedal unit further comprises a pedal simulator configured to provide the driver with a sense of pedal feel by generating a reaction force against the pedal effort.

* * * * *